United States Patent [19]
Endo et al.

[11] Patent Number: 4,879,331

[45] Date of Patent: Nov. 7, 1989

[54] SELF-LUBRICATING THERMOPLASTIC RESIN WEAR PART

[75] Inventors: Toshihiko Endo; Nobuyuki Matsunaga, both of Fuji, Japan

[73] Assignee: Polyplastics Co., Ltd., Osaka, Japan

[21] Appl. No.: 197,873

[22] Filed: May 24, 1988

[30] Foreign Application Priority Data

May 29, 1987 [JP] Japan ................. 62-134177

[51] Int. Cl.$^4$ ............................................. C08K 5/54
[52] U.S. Cl. ................................... 524/267; 524/263; 524/539; 524/542
[58] Field of Search ............... 524/263, 267, 539, 542; 525/398, 446

[56] References Cited

U.S. PATENT DOCUMENTS

| | | | |
|---|---|---|---|
| 3,491,048 | 1/1970 | Sargent | 260/29.1 |
| 4,131,594 | 12/1978 | Nakamura et al. | 524/504 |
| 4,387,176 | 6/1983 | Frye | 524/268 |
| 4,472,556 | 9/1984 | Lipowitz et al. | 525/106 |
| 4,485,212 | 11/1984 | Wefer | 525/64 |
| 4,487,858 | 12/1984 | Lovgren et al. | 524/267 |

FOREIGN PATENT DOCUMENTS 61-254665 11/1986 Japan .

Primary Examiner—Lewis T. Jacobs
Attorney, Agent, or Firm—Nixon & Vanderhye

[57] ABSTRACT

A thermoplastic resin composition comprises (A) 99.9 to 60 parts by weight of a thermoplastic polyester or a polyacetal, (B) 0.05 to 20 parts by weight of a silicone oil having a viscosity of 150,000 cSt or larger and (C) 0.05 to 20 parts by weight of a lubricating oil having a viscosity of 3,000 cSt or smaller and is improved in durability to abrasion.

3 Claims, No Drawings

SELF-LUBRICATING THERMOPLASTIC RESIN WEAR PART

The present invention relates to wear parts (e.g. a sliding member) formed of a thermoplastic resin composition which exhibits excellent long-term and short-term frictional and abrasive characteristics producing (e.g. only slight frictional noise when sliding). In particular, the invention relates to wear parts formed of a thermoplastic resin composition comprising (A) a thermoplastic polyester resin or a polyacetal resin; (B) a silicon oil having a viscosity of 150,000 cSt or more; and (C) a lubricating oil having a viscosity of 3,000 cSt or less.

BACKGROUND AND SUMMARY OF THE INVENTION

Thermoplastic polyester resins, such as poly-ethylene terephthalate and poly-butylene terephthalate, or polyacetal resins have been used in a number of end-use applications as engineering resins in recent years since they exhibit superior mechanical and electric properties, heat and chemical resistances and workability. And, there is a tendency that these resins will be used under still more severe conditions with an expansion of their end-use applications. As such, these resins will be required to exhibit improved properties for many such applications. Some of these properties are improved frictional and abrasive characteristics, long-term durability of such improved frictional and abrasive characteristics, reduction of frictional noise due to the wear part's sliding or the like, (such as sliding members and actuator members, used in cars, electric and electronic products and the like).

For example, it is known that (1) solid lubricants, such as molybdenum disulfide and graphite, (2) powdery and fibrous poly-tetrafluoroethylene resin, (3) liquid or semi-solid lubricants, such as petroleum lubricating oils, synthetic lubricating oils, aliphatic alcohols or their esters, and the like may be added as a means of improving the frictional and abrasive characteristics of thermoplastic resins. It goes without saying that some improvements of the frictional and abrasive characteristics by these known methods ensues, and in particular the requirements can be met in those situations where a part formed of such resins is used only for a short time under sliding conditions at relatively low speed and load. However, problems have occurred in that the frictional characteristics become insufficient as the sliding speed and load increase. The frictional characteristics therefore significantly deteriorated over time in use even under sliding conditions of low speeds and loads. In addition, it is known that polyethylene, polytetrafluoroethylene and the like may be added to soften resins, and has been generally used as a method of improving frictional noise when sliding. However, with this known technique, a silencing property capable of meeting the desired requirements cannot always be attained. In addition, problems have occurred in that physical properties, such as mechanical strength, decrease.

As above described, according to the conventional known techniques, the requirements, which are being increasingly made more severe, cannot be met with respect to frictional and abrasive characteristics, in particular such characteristics under high speed and a high load sliding conditions or in terms of long-term anti-friction characteristics or silencing characteristics when sliding. Accordingly, improvements in these areas have been needed.

DETAILED DESCRIPTION OF THE PREFERRED EMBODIMENTS

The present inventors have found that improvements to short-term and long-term frictional and abrasive characteristics and reduced frictional noise when sliding (without deleteriously affecting the excellent properties incidental to thermoplastic polyester and polyacetal resins) may be achieved by the addition of silicon oils having a specified high viscosity and lubricating oils having a specified low viscosity.

That is to say, it is an object of the present invention to provide a wear part formed of a thermoplastic resin composition comprising (A) a thermoplastic polyester resin or a polyacetal resin of 99.9 to 60.0 parts by weight; (B) a silicon oil having a viscosity of 150,000 cSt or more of 0.05 to 20.0 parts by weight; and (C) a lubricating oil having a viscosity of 3,000 cSt or less of 0.05 to 20.0 parts by weight.

The thermoplastic polyester used in the present invention includes polyesters obtained by the poly-condensation of dicarboxylic compounds and dihydroxy compounds, the poly-condensation of oxycarboxylic compounds, the poly-condensation of these three ingredients mixture and the like. Both homopolyesters and copolyesters are effective to the present invention.

The dicarboxylic acid compounds used in the present invention include known dicarboxylic acid compounds, such as terephthalic acid, isophthalic acid, naphthalene dicarboxylic acid, diphenyl-dicarboxylic acid, diphenylether dicarboxylic acid, diphenylethane dicarboxylic acid, cyclohexane dicarboxylic acid, adipic acid and sebacic acid, and alkyl-, alcoxy- or halogen-substituted compounds thereof. In addition, these dicarboxylic acid compounds can be used also in the form of ester-formable derivatives, such as lower alcohol esters, for example dimethyl ester. In the present invention, the above described compounds are used singly or in combination. Nextly, the dihydroxy compounds, include dihydroxy compounds, such as ethylene glycol, propylene glycol, butane diol, neopentyl glycol, hydroquinone, resorcine, dihydroxy phenyl, naphthalene diol, dihydroxydiphenyl ether, cyclohexane diol and 2,2'-bis(4-hydroxyphenyl)propane, alkyl-, alcoxy- or halogen-substituted compounds thereof and the like. They can be used singly or in combination.

In addition, oxycarboxylic acids include oxycarboxylic acids, such as oxybenzoic acid, oxynaphthoeic acid and diphenylene oxycarboxylic acid, and alkyl-, alcoxy- or halogen-substituted compounds thereof. Also esterformable derivatives of these compounds can be used. In the present invention, these compounds can be used singly or in combination.

According to the present invention, every thermoplastic polyester formed by the poly-condensation of the above described compounds as monomers can be used singly or in combination. It is desired to use polyalkylene terephthalate, preferably polybutylene terephthalate. In this case, the effects of the present invention are notable.

In addition, in the present invention, the thermoplastic polyesters may be denatured by known methods, such as crosslinkage and graft-polymerization.

The polyacetal resins used in the present invention include polyacetal homopolymers and polyacetal copolymers of which greater part of a main chain is formed of an oxymethylene chain. In addition, even though polyacetals are denatured by crosslinkage or graft-copolymerization according to the known methods, they can be used as the basic resin and the effects of the present invention can be exhibited.

Nextly, dimethyl-polysiloxane or compounds obtained by substituting a part of methyl groups in dimethyl-polysiloxane with at least one kind selected from the group consisting of hydrogen, phenyl group, halogenized phenyl group, halogenized alkyl group, fluoroester group and the like having a remarkably high viscosity of 150,000 cSt (at 25° C.) as measured according to ASTM D-445 are used as the silicon oils (ingredient B) added to the above described thermoplastic resins (ingredient A) in the present invention.

If the silicon oils having a low viscosity lower than 150,000 cSt, in particular a viscosity of 100,000 cSt or less, are added, the initial frictional and abrasive characteristics are improved but the long-term frictional and abrasive characteristics or the frictional noise when sliding, which are aimed in the present invention, can not be sufficiently improved while if the rubbery silicon resins having a high degree of polymerization are used, not only it is remarkably difficult to uniformly disperse them in the resins and the improvement of frictional and abrasive characteristics can not be expected but also mechanical properties are spoiled according to circumstances, which are not desirable. The silicon oils having a viscosity of 200,000 to 1,000,000 cSt are more preferably used.

In addition, in the present invention, such silicon oils can be diluted with solvents and the like or can be adsorbed by inorganic or organic solid bodies to be added. This is desirable in many cases in view of the workability of the addition of the silicon oils and the dispersivity of the silicon oils. In addition, it is desirable for the improved dispersion of the silicon oils in the resin also to use a dispersion medium at the same time.

In the present invention, the lubricating oils having a viscosity of 3,000 cSt or less (25° C.) are added as the ingredient C together with such highly viscous silicon oils (ingredient B). Thus, the synergistic effect appears to remarkably improve the short-term frictional and abrasive characteristics as well as the long-term frictional and abrasive characteristics. In order to attain the synergistic effect more effectively, it is desirable to use the lubricating oils having a viscosity of 2,000 cSt or less.

The lubricating oils (ingredient C) used in the present invention are known lubricating oils such as synthetic lubricating oils, petroleum lubricating oils and plant and animal oils. At least one kind selected from the group consisting of them is added. The petroleum lubricating oils are oils mainly comprising hydrocarbons of paraffine series, naphthene series and the like obtained by the fractional distillation and the rectification of petroleum. They include a turbine oil, machine oil, engine oil, gear oil, spindle oil, refrigerator oil, paraffine oil and the like.

In addition, the synthetic lubricating oils include various kinds of silicon oil, poly-alkylene glycol oil, polyol ester oil, polyphenyl ether oil, diester oil, polyolefin oil and the like.

In addition, the plant and animal oils are oils extracted from a fruit of plants, seed, fatty flesh and the like. They include a soybean oil, coconut oil, palm oil, cottonseed oil, linseed oil, rapeseed oil, castor oil, whale oil, squwalene and the like. Also natural and synthetic higher fatty acids and esters thereof, which are main ingredients of these plant and animal oils, are included in the lubricating oils according to the present invention so far as they meet the requirements of the viscosity for the ingredient C.

In addition, in order to improve the properties of the lubricating oils (ingredient C), an antioxidant, extreme pressure agent, abrasion-resisting agent, oily agent, viscosity-improving agent, pour point-lowering agent and the like may be added to them. Also a tackyfier and the like may be added to them to form a grease or a diluent and the like may be added to them. In short, every one meeting the requirements for the base oil in the present invention can be used.

In the present invention, it is desirable to use petroleum lubricating oils, in particular oils of paraffine series, of such lubricants. It is desirable also to use silicon oils belonging to the synthetic lubricating oils.

In the present invention, the above describing high-viscosity silicon oils (ingredient B) and low-viscosity lubricating oils (ingredient C) are added at a ratio of 0.05 to 20 parts by weight based on 99.9 to 60 parts by weight of the thermoplastic resin (ingredient A). If they are added at a ratio less than this, the remarkable improvement of frictional and abrasive characteristics due to the synergistic effect can not be attained while if they are added at a ratio more than this, the workability, mechanical properties and the like are remarkably lowered according to circumstances, which are not desirable. Accordingly, in view of the balance of these physical properties, it is desired that they are added at a ratio of 0.2 to 10 parts by weight based on 99.9 to 60 parts by weight of the thermoplastic resin (ingredient A). In addition, in order to attain the synergistic effect for the improvement of frictional and abrasive characteristics more effectively, it is desirable that the low-viscosity lubricating oils (ingredient C) and the high-viscosity silicon oils (ingredient B) are added at a ratio of 1/5 to 5/1.

Although the reason of the remarkable improvement of the short-term and long-term frictional and abrasive characteristics due to the synergistic effect resulting from the simultaneous use of the high-viscosity silicon oils and the low-viscosity lubricating oils has not been always obvious, the present inventors, guess that in the system wherein the high-viscosity silicon oils and the low-viscosity lubricating oils, the highly viscous silicon oils form a stable film, which can not be easily separated, on the surface of the resin or in the vicinity of said surface of the resin, whereby the low-viscosity lubricating oils, which easily bleed out and have insufficient long-term characteristics in the nature of things, are stably held in this film, and as a result, excellent frictional characteristics of the low-viscosity lubricating oils can be maintained not only for a short time but also for a remarkably long time.

In order to further improve the sliding characteristics, solid lubricants, such as graphite, molybdenum disulfide and metal soap, polymers, such as polyethylene resin and polytetrafluoroethylene resin, capable of giving an excellent lubricating property and the like can be added to the composite according to the present invention. In addition, in order to improve physical properties according to objects, various kinds of known additive can be further added.

The additives include an antioxidant, weather- and light-resisting stabilizer, heat stabilizer, unguent, releasing agent, nuclear agent, silicon oil dispersion agent, antistatic agent, flame retardant, coloring agent and the like.

In addition, fibrous, plate-like and granular inorganic fillers, such as glass fiber, can be added to the composite according to the present invention according to objects. In addition, it goes without saying that other resins or high molecular substances can be supplementarily added.

The composite according to the present invention can be easily prepared by the known methods which have been generally used as the methods of preparing the conventional resin composites. For example, a method, in which the ingredients are mixed and then, the mixture is kneaded and extruded in a uniaxial or biaxial extruder to prepare pellets followed by molding, a method, in which pellets having a different composition are once prepared and then, the resulting pellets are blended in an appointed quantity to be subjected to the molding followed by obtaining a molded product having the aimed composition, a method in which at least one of ingredients is directly charged in a molding machine, and the like can be all applied.

In particular, in a method, in which the high-viscosity silicon oils (ingredient B) are previously mixed with the low-viscosity lubricating oils (ingredient C) and then, the resulting mixture is added to the resin (ingredient A), the lubricants (ingredients B, C) are easy to handle, which is desirable in operation.

[Preferred Embodiments]

The present invention is more concretely described below with reference to the preferred embodiments but not limited by them.

Examples 1 to 9 and Comparative Examples 1 to 6

The silicon oils having a viscosity of 150,000 cSt or more and various kinds of lubricating oil having a viscosity of 3,000 cSt or less as shown in Table 1 were mixed with a poly-butylene terephthalate resin ["DURANEX 2000" manufactured by Polyplastics Co., Ltd.] at a ratio shown in Table 1 and then, the resulting mixture was molten and kneaded in a biaxial extruder to prepare a pellet-like composite. Subsequently, these pellets were injection molded to prepare test pieces which were evaluated. In addition, for comparison, also test pieces without containing both the high-viscosity silicon oils and the low-viscosity lubricating oils and test pieces containing merely one of them were evaluated in the same manner as the above described test pieces. All of the results are shown in Table 1.

In addition, the evaluation of sliding characteristics was carried out by the following methods and that of tensile characteristics was carried out in compliance with the method of ASTM.

Kinematic frictional characteristics

Kinematic friction factor was measured immediately after the start of sliding and after sliding for 60 minutes at a pressure of 0.75 kg/cm$^2$, a linear speed of 180 mm/sec and a contact area of 2.0 cm$^2$ with ABS resin as the opposite material using a Suzuki type friction and abrasion tester.

Frictional noise characteristics

The state of generating the frictional noise during a time while materials of the same kind are scrubbed to each other for 10 hours was observed at a pressure of 3.5 kg/cm$^2$, a linear speed of 50 mm/sec and a contact area of 2.0 cm$^2$ using the above described tester.

Examples 10 to 13 and Comparative Examples 7 to 9

Silicon oils having a viscosity of 150,000 cSt or more and lubricating oils having a viscosity of 3,000 cSt or less as shown in Table 2 were mixed with a polyacetal resin ["DURACON M90" manufactured by Polyplastics Co., Ltd.] at a ratio shown in Table 2 and the evaluation was carried out in the same manner as in Examples 1 to 9. In addition, for comparison, test pieces without containing any one of the high-viscosity silicon oil and the low-viscosity lubricating oil and test pieces without containing both the high-viscosity silicon oil and the low-viscosity lubricating oil were evaluated in the same manner. The results are all shown in Table 2.

As obvious from the above description and preferred embodiments, a synergistic effect appears by adding a silicon oil having a viscosity of 150,000 cSt or more and a lubricating oil having a viscosity of 3,000 cSt or less to a thermoplastic polyester resin or a polyacetal resin to remarkably improve various kinds of characteristic relating to the sliding, such as short-term and long-term frictional and abrasive characteristics and a frictional noise when sliding, and also a disadvantage of lowering other physical properties to such an extent that they are substantially called in question does not occur.

As above described, a composite according to the present invention has balanced excellent properties and can be suitably used as a sliding member, such as gear, bearing and keyboard, in the fields, such as cars, electric and electronic instruments, office machineries and miscellaneous goods.

TABLE 1

| | | Composition | | | | | Dynamic frictional characteristics Dynamical friction factor (μd) | | | Frictional noise character- istics | Tensile characteristics | | Note |
|---|---|---|---|---|---|---|---|---|---|---|---|---|---|
| | | Resin (ingredient A) | High-viscosity silicon oil (ingredient B) | | Low-viscosity lubricating oil (ingredient C) | | | | | | | | |
| | | Kind Quantity added (parts by weight) | Viscosity (cSt) | Quantity added (parts by weight) | Kind | Quantity added (parts by weight) | Ini- tial | After one hour | After 6 hours | | Tensile strength (kg/cm²) | Elong- ation (%) | |
| Example | 1 | Poly-butylene terephthalate (98) | 300,000 | 1 | Silicon oil 10 cSt | 1 | 0.09 | 0.10 | 0.16 | Almost none | 472 | 142 | Excellent extrudability Excellent moldability |
| | 2 | Poly-butylene terephthalate (98) | " | 1 | Silicon oil 350 cSt | 1 | 0.10 | 0.12 | 0.18 | " | 465 | 129 | Excellent extrudability Excellent moldability |
| | 3 | Poly-butylene terephthalate (98) | 1,000,000 | 1 | Silicon oil 10 cSt | 1 | 0.09 | 0.11 | 0.14 | " | 470 | 136 | Excellent extrudability Excellent moldability |
| | 4 | Poly-butylene terephthalate (99) | " | 0.5 | Paraffine oil 1000 cSt | 0.5 | 0.11 | 0.15 | 0.26 | Slight noise | 521 | 68 | Excellent extrudability Excellent moldability |
| | 5 | Poly-butylene terephthalate (97.5) | " | 0.5 | Paraffine oil 1000 cSt | 2 | 0.08 | 0.11 | 0.23 | Slight noise | 458 | 71 | Slightly poor extrudability Slightly poor moldability |
| | 6 | Poly-butylene terephthalate (98) | " | 1 | Paraffine oil 1000 cSt | 1 | 0.09 | 0.10 | 0.17 | Almost none | 469 | 104 | Excellent extrudability Excellent moldability |
| | 7 | Poly-butylene terephthalate (97) | " | 2 | Paraffine oil 1000 cSt | 1 | 0.09 | 0.09 | 0.15 | " | 439 | 140 | Excellent extrudability Excellent moldability |
| | 8 | Poly-butylene terephthalate (96) | " | 3 | Paraffine oil 1000 cSt | 1 | 0.11 | 0.11 | 0.13 | " | 416 | 200< | Excellent extrudability Excellent moldability |
| | 9 | Poly-butylene terephthalate (98) | " | 1 | Tetraphenyl ether 350 cSt | 1 | 0.11 | 0.13 | 0.21 | " | 474 | 112 | Excellent extrudability Excellent moldability |
| Comparative example | 1 | Poly-butylene terephthalate (98) | — | — | — | — | 0.30 | 0.50 | — | Large | 569 | 38 | Excellent extrudability Excellent moldability |
| | 2 | Poly-butylene terephthalate (98) | — | — | Silicon oil 10 cSt | 1 | 0.11 | 0.45 | — | Middle | 518 | 92 | Poor extrudability Poor moldability |

TABLE 1-continued

| | Resin (ingredient A) Kind Quantity added (parts by weight) | Composition | | Low-viscosity lubricating oil (ingredient C) | | Dynamic frictional characteristics Dynamical friction factor (μd) | | | Frictional noise characteristics | Tensile characteristics | | Note |
|---|---|---|---|---|---|---|---|---|---|---|---|---|
| | | High-viscosity silicon oil (ingredient B) | | | | | | | | | | |
| | | Viscosity (cSt) | Quantity added (parts by weight) | Kind | Quantity added (parts by weight) | Initial | After one hour | After 6 hours | | Tensile strength (kg/cm²) | Elongation (%) | |
| 3 | Poly-butylene terephthalate | — | — | Paraffine oil 100 cSt | 1 | 0.11 | 0.47 | — | Middle | 511 | 74 | Poor extrudability Poor moldability |
| 4 | Poly-butylene terephthalate | 1,000,000 | 2 | — | — | 0.14 | 0.22 | 0.34 | Almost none | 466 | 130 | Excellent extrudability Excellent moldability |
| 5 | Poly-butylene terephthalate | 60,000 | 1 | Silicon oil 10 cSt | 1 | 0.09 | 0.41 | — | Middle to small | 471 | 142 | Slightly poor extrudability Slightly poor moldability |
| 6 | Poly-butylene terephthalate | " | 1 | Paraffine oil 1000 cSt | 1 | 0.09 | 0.43 | — | Middle to small | 464 | 107 | Slightly poor extrudability Slightly poor moldability |

TABLE 2

| | | Resin (ingredient A) Kind Quantity added (parts by weight) | Composition High-viscosity silicon oil (ingredient B) Viscosity (cSt) | Quantity added (parts by weight) | Low-viscosity lubricating oil (ingredient C) Kind | Quantity added (parts by weight) | Dynamic frictional characteristics Dynamical friction factor (μd) Initial | After one hour | After 6 hours | Frictional noise characteristics | Tensile characteristics Tensile strength (kg/cm²) | Elongation (%) | Note |
|---|---|---|---|---|---|---|---|---|---|---|---|---|---|
| Example | 10 | Polyacetal (98) | 300,000 | 1 | Silicon oil 10 cSt | 1 | 0.10 | 0.13 | 0.16 | Almost none | 522 | 148 | Excellent extrudability Excellent moldability |
| | 11 | Polyacetal (98) | 1,000,000 | 1 | Silicon oil 10 cSt | 1 | 0.10 | 0.12 | 0.18 | " | 515 | 137 | Excellent extrudability Excellent moldability |
| | 12 | Polyacetal (97) | 1,000,000 | 2 | Silicon oil 10 cSt | 1 | 0.11 | 0.12 | 0.14 | " | 468 | 164 | Excellent extrudability Excellent moldability |
| | 13 | Polyacetal (97) | 1,000,000 | 2 | Parrafine oil 1000 cSt | 1 | 0.10 | 0.13 | 0.15 | " | 472 | 153 | Excellent extrudability Excellent moldability |
| Comparative example | 7 | Polyacetal (100) | — | — | — | — | 0.21 | 0.38 | 0.41 | Large | 625 | 67 | Excellent extrudability Excellent moldability |
| | 8 | Polyacetal (98) | 1,000,000 | 2 | 1000 cSt | — | 0.14 | 0.17 | 0.24 | Almost none | 517 | 155 | Excellent extrudability Excellent moldability |
| | 9 | Polyacetal (99) | — | — | Silicon oil 10 cSt | 1 | (0.09)* | (0.27)* | (0.39)* | (Middle)* | (548)* | (78)* | Remarkably poor extrudability Remarkably poor moldability |

*The moldability is remarkably poor (poorly measurable) and it is difficult to say that it is a desirable test piece.

What is claimed is:

1. A self-lubricating wear part having improved anti-friction and anti-frictional noise characteristics formed of a thermoplastic resin composition which consists essentially of (i) between 99.9 to 60 parts by weight of a thermoplastic polyester or polyacetal resin, (ii) between 0.05 to 20 parts by weight of a silicone oil having a viscosity of 150,000 cSt or more, and (iii) between 0.05 to 20 parts by weight of a lubricating oil having a viscosity of 3,000 cSt or less.

2. A wear part as in claim 1, wherein the polyester resin is selected from polyalkylene terephthalate and polybutylene terephthalate.

3. A wear part as in claim 1, wherein the lubricating oil is a paraffin oil.

* * * * *

UNITED STATES PATENT AND TRADEMARK OFFICE
CERTIFICATE OF CORRECTION

PATENT NO. : 4,879,331

DATED : November 7, 1989

INVENTOR(S) : ENDO et al

It is certified that error appears in the above-identified patent and that said Letters Patent is hereby corrected as shown below:

Column 1, line 8, after "characteristics" delete "producing (e.g." and insert --(e.g., producing--;
    line 45, change "ensues" to --ensue--;
    line 66, after "and" delete "a".

Column 2, line 14, delete "That is to say," and insert --More specifically,--
    line 68, after "which" delete "greater" and insert --a major--.

Column 3, line 1, after "of" delete "an" and after "oxymethylene" delete "chain" and insert --units--;
    line 16, after "a" delete "low";
    line 21, before "which" insert --(--, delete "aimed in" and insert --objects of-- and after "invention" insert --)--;
    line 22, after "improved" delete "while" and insert --. On the other hand,--;
    line 24, change "it is" to --is it--;
    line 25, after "resins" delete "and" and insert --but--;
    line 26, after "expected" delete "but also" and insert --. In addition,-
    line 54, delete "paraf";
    line 55, delete "fine" and insert --paraffin--;
    line 57, after "include" delete "a";
    line 64, after "from" delete "a" and insert --the--.

UNITED STATES PATENT AND TRADEMARK OFFICE
CERTIFICATE OF CORRECTION

PATENT NO.    :   4,879,331

DATED         :   November 7, 1989

INVENTOR(S)   :   Endo et al

It is certified that error appears in the above-identified patent and that said Letters Patent is hereby corrected as shown below:

Column 4, line 15, change "paraffine" to --paraffin--;
      line 18, change "describing" to --described--;
      line 44, after "not" delete "been";
      line 45, after "always" insert --been-- and after "inventors" delete ", guess" and insert --assume--;
      line 46, after "system" delete "wherein" and insert --including both--;
      line 48, change "be easily" to --easily be--;
      line 53, after "film" delete ", and as" and insert --. As--;

Column 5, line 35, before "not" insert --is--.

Signed and Sealed this

Twenty-sixth Day of February, 1991

Attest:

HARRY F. MANBECK, JR.

*Attesting Officer*         *Commissioner of Patents and Trademarks*